United States Patent
Hyodo et al.

(10) Patent No.: US 10,540,633 B2
(45) Date of Patent: Jan. 21, 2020

(54) FACILITY MANAGEMENT UNIT THAT REPLENISHES MULTIPLE MANUFACTURING FACILITIES WITH SUPPLIES, AND PRODUCTION SYSTEM

(71) Applicant: FANUC CORPORATION, Yamanashi (JP)

(72) Inventors: Hiroaki Hyodo, Yamanashi (JP);
Takenori Ono, Yamanashi (JP);
Masaaki Shindou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 186 days.

(21) Appl. No.: 15/485,311

(22) Filed: Apr. 12, 2017

(65) Prior Publication Data
US 2017/0300853 A1  Oct. 19, 2017

(30) Foreign Application Priority Data

Apr. 14, 2016 (JP) ................ 2016-081046

(51) Int. Cl.
*G06Q 10/08* (2012.01)
*G05B 19/418* (2006.01)

(52) U.S. Cl.
CPC ..... *G06Q 10/087* (2013.01); *G05B 19/41865* (2013.01); *Y02P 90/86* (2015.11)

(58) Field of Classification Search
CPC .. G06Q 10/087; G06Q 10/0875; Y02P 90/86; G03F 7/70975; G05B 23/0283
See application file for complete search history.

(56) References Cited

U.S. PATENT DOCUMENTS

2007/0156543 A1   7/2007 Klim et al.

FOREIGN PATENT DOCUMENTS

| CN | 104272431 A | 1/2015 |
|---|---|---|
| JP | S60-146639 A | 8/1985 |
| JP | 05-186004 A | 7/1993 |
| JP | 7-105285 A | 4/1995 |
| JP | 2000-176798 A | 6/2000 |
| JP | 2004-287785 A | 10/2004 |
| JP | 2005-258585 A | 9/2005 |
| JP | 2006-331071 A | 12/2006 |
| JP | 2009-522637 A | 6/2009 |

(Continued)

*Primary Examiner* — Peter Ludwig
*Assistant Examiner* — Avia Salman
(74) *Attorney, Agent, or Firm* — Hauptman Ham, LLP

(57) ABSTRACT

A facility management unit includes a facility information collection part, a supply replenishment determination part, an inventory information confirmation part, and a transport command part. The facility information collection part collects supply information indicating the consumption status of supplies for each manufacturing facility in real time. The supply replenishment determination part determines the presence or absence of manufacturing facilities that require replenishment with supplies and determines the order of replenishment with supplies for all the manufacturing facilities that require replenishment with supplies. The transport command part indicates a transport path, along which the supplies are sequentially transported from a storage facility to the manufacturing facilities according to the order of replenishment with supplies, to a transport facility.

7 Claims, 4 Drawing Sheets

(56) References Cited

FOREIGN PATENT DOCUMENTS

| JP | 2011-186910 | A | | 9/2011 | | |
|----|----|----|----|----|----|----|
| JP | H5186004 | A | * | 4/2013 | ............ | F16N 39/04 |
| JP | 2014-067121 | A | | 4/2014 | | |
| JP | 2001-350510 | A | | 4/2016 | | |
| WO | 2007/078371 | A2 | | 7/2007 | | |
| WO | WO-2007078371 | A2 | * | 7/2007 | ............ | G06Q 10/06 |

* cited by examiner

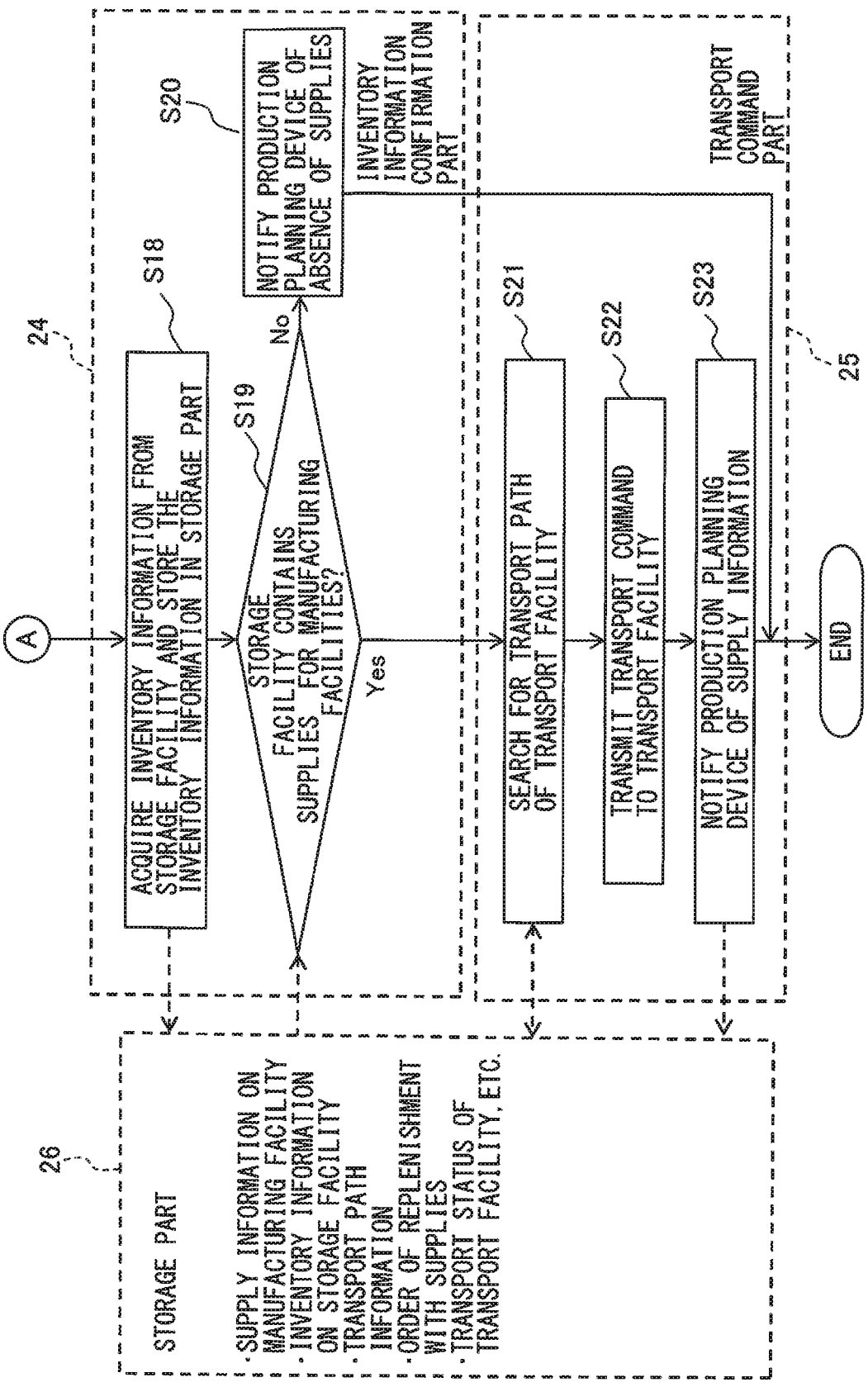

FACILITY MANAGEMENT UNIT THAT REPLENISHES MULTIPLE MANUFACTURING FACILITIES WITH SUPPLIES, AND PRODUCTION SYSTEM

RELATED APPLICATIONS

The present application claims priority to Japanese Patent Application No. 2016-081046 filed Apr. 14, 2016, the disclosures of which is hereby incorporated by reference herein in its entirety.

BACKGROUND OF THE INVENTION

1. Field of the Invention

The present invention relates to a facility management unit that manages the manufacturing statuses of multiple manufacturing facilities, and a production system including the facility management unit.

2. Description of the Related Art

In a manufacturing factory, multiple machines such as machine tools and robots are properly arranged to constitute a manufacturing facility of a line production system or a cell production system, that is, a manufacturing line or a manufacturing cell. In each manufacturing facility, parts are machined or welded using different machines. The machines constituting the manufacturing facility operate in response to a manufacturing instruction from an administrative computer that manages a controller connected to each of the machines. The administrative computer manages a manufacturing process, part quality, safety, etc., while acquiring manufacturing information including a machine status and a production volume from the manufacturing facility.

In a conventional manufacturing factory, supplies including workpieces, tools, and oils for manufacturing parts in manufacturing facilities are managed for the respective manufacturing facilities. An operator replenishes the manufacturing facility with supplies at a proper time. However, if supplies stored in the manufacturing facility are not available during the manufacturing of parts, manufacturing is suspended, reducing productivity. Thus, various methods have been proposed to quickly inform an operator of the need for replenishment of supplies.

For example, Japanese Unexamined Patent Publication (Kokai) No. 7-105285 (hereinafter referred to as Patent Literature 1) discloses a manufacturing-line operating-status monitoring system configured to collect data on the operating statuses of machines in real time and calculate the operating rates, defective rates, and overall equipment efficiency of the machines from the data. Moreover, the system has the function of determining the degrees of wear of machine parts according to, for example, the operation time of machines and the number of machined parts, and outputting an instruction to change parts to an operator.

Japanese Unexamined Patent Publication (Kokai) No. 2001-350510 (hereinafter referred to as Patent Literature 2) discloses a machine tool maintenance/management system that receives data on the operating statuses of machines, evaluates the degree of wear of the machines based on the data, stores the evaluated degrees of wear in a storage, and collectively manages the degrees of wear of the machines.

Japanese Unexamined Patent Publication (Kokai) No. 2005-258585 (hereinafter referred to as Patent Literature 3) discloses an automatic part ordering system configured to automatically predict the wear period of a machine part according to a machine condition and automatically determine the timing of ordering based on the wear period.

Japanese Unexamined Patent Publication (Kokai) No. 2004-287785 (hereinafter referred to as Patent Literature 4) discloses a facility maintenance/management system that stores, in memory, manufacturing facility information including a maintenance plan, a budget, cost, and inventory of parts, and maintains a manufacturing facility based on the stored information.

Japanese Unexamined Patent Publication (Kokai) No. 2011-186910 (hereinafter referred to as Patent Literature 5) discloses a tool-life management system configured to store, in a storage, the lifetime tool usage number of each production line and to indicate that a tool has reached the end of life when the total number of uses of the tool reaches the lifetime tool usage number.

In the conventional manufacturing factory, however, information on supplies necessary for manufacturing parts in the manufacturing facilities is managed for each of the manufacturing facilities, the information including, for example, the inventory statuses, consumption statuses, and lifetimes of supplies. However, the information on the supplies is not shared among the manufacturing facilities. Thus, in the entire manufacturing factory, it is not understood which of the manufacturing facilities needs to be preferentially replenished with supplies.

Furthermore, the inventions disclosed in Patent Literatures 1 to 5 have the following problems:

The invention disclosed in Patent Literature 1 does not include a means to share information among manufacturing facilities or means to determine the priority of replenishment of manufacturing facilities with consumables. Thus, the manufacturing facilities cannot be efficiently replenished with supplies.

Furthermore, the inventions disclosed in Patent Literature 2 and Patent Literature 3 do not have the function of determining the priority of transportation of supplies to manufacturing facilities during the replenishment of the supplies. Thus, the manufacturing facilities cannot be efficiently replenished with supplies.

In the invention disclosed in Patent Literature 4, the manufacturing facility is maintained based on past result information. In other words, the invention does not have a means to collect information on the supplies of manufacturing facilities in real time. This prevents correct prediction of a shortage of supplies.

In the invention disclosed in Patent Literature 5, information on supplies is not shared among multiple manufacturing facilities, leading to difficulty in determining the manufacturing facility to be preferentially replenished with supplies.

SUMMARY OF THE INVENTION

The present invention provides a facility management unit that can efficiently replenish all manufacturing facilities with supplies in a manufacturing factory, and a production system.

A first aspect of the present disclosure provides a facility management unit that manages manufacturing of parts in a plurality of manufacturing facilities, the facility management unit being connected so as to communicate with the manufacturing facilities that manufacture the parts, a storage facility that stores supplies used for manufacturing the parts in the manufacturing facilities, and a transport facility that transports the supplies between the storage facility and the manufacturing facilities, the facility management unit including:

a facility information collection part that collects supply information on the consumption statuses of the supplies for the manufacturing facilities in real time;

a supply replenishment determination part that determines whether the manufacturing facilities require replenishment with the supplies based on the supply information collected on the manufacturing facilities by the facility information collection part and determines the order of replenishment with the supplies for all the manufacturing facilities that require replenishment with the supplies;

an inventory information confirmation part that acquires inventory information on the supplies from the storage facility and confirms, based on the inventory information, whether the storage facility contains the supplies for the manufacturing facilities judged to require replenishment with the supplies by the supply replenishment determination part based on the inventory information; and a transport command part that indicates, to the transport facility, a transport path along which the supplies are sequentially transported from the storage facility to the manufacturing facilities in the supply replenishment order determined by the supply replenishment determination part, if the storage facility contains the supplies for the manufacturing facilities in a confirmation result of the inventory information confirmation part.

According to the facility management unit of the first aspect, a second aspect provides a facility management unit in which the supply information includes the number of supplies stored in each of the manufacturing facilities and the consumption rate of the supplies in each of the manufacturing facilities, and the supply replenishment determination part determines the order of replenishment with the supplies based on the number of parts to be manufactured in each of the manufacturing facilities, the number of supplies stored in each of the manufacturing facilities, and the consumption rate of the supplies in each of the manufacturing facilities.

According to the facility management unit of the first aspect, a third aspect provides a facility management unit in which the supply information includes information on the number of supplies stored in the manufacturing facility, the number of lost supplies, and the consumption rate of the supplies in each of the manufacturing facilities, and the supply replenishment determination part determines the order of replenishment with the supplies based on the number of parts to be manufactured in each of the manufacturing facilities, the number of supplies stored in each of the manufacturing facilities, the number of lost supplies, and the consumption rate of the supplies in each of the manufacturing facilities.

According to the facility management unit of the third aspect, a fourth aspect provides a facility management unit in which the supply replenishment determination part acquires information on the operating statuses of the manufacturing facilities and determines the order of replenishment with the supplies in consideration of the information on the operating statuses of the manufacturing facilities.

According to the facility management unit of any one of the first to fourth aspects, a fifth aspect provides a facility management unit in which if the inventory information confirmation part determines that the storage facility does not contain the supplies for the manufacturing facilities, the absence of the supplies in the storage facility is notified to the outside of the facility management unit.

According to the facility management unit of any one of the first to fifth aspects, a sixth aspect provides a facility management unit in which the manufacturing facility includes at least one machine where the supplies are used.

According to the facility management unit of any one of the first to sixth aspects, a seventh aspect provides a facility management unit configured to operate the manufacturing facilities according to a production planning instruction from a production planning device connected so as to communicate with the facility management unit.

An eighth aspect provides a production system including: the facility management unit according to any one of the first to seventh aspects; a production planning device that indicates a production plan to the facility management unit, the production planning device being connected so as to communicate with the facility management unit; a storage facility that stores supplies for manufacturing parts in manufacturing facilities, the storage facility being connected so as to communicate with the facility management unit; and a transport facility that transports the supplies between the storage facility and the manufacturing facilities, the transport facility being connected so as to communicate with the facility management unit.

BRIEF DESCRIPTION OF THE DRAWINGS

A detailed description of a typical embodiment of the present invention shown in the accompanying drawings further clarifies the object, characteristics, advantages of the present invention and other objects, characteristics, and advantages of the present invention.

FIG. 4 is a flowchart showing the other part of the procedure of the facility management unit shown in FIG. 1.

DETAILED DESCRIPTION

Figure 1:
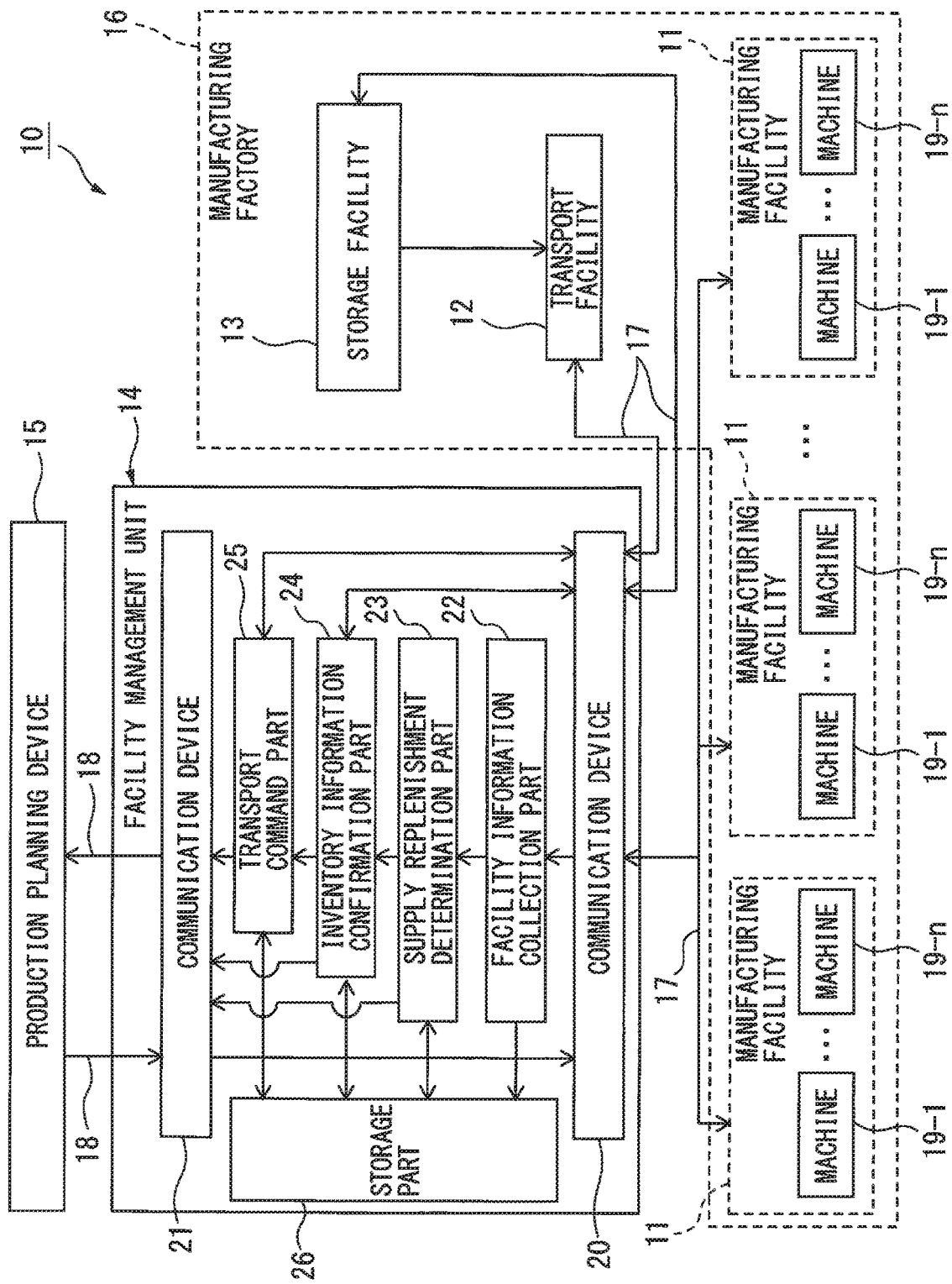
FIG. 1 is a block diagram schematically showing a production system including a facility management unit according to an embodiment.

An embodiment of the present disclosure will be described below with reference to the accompanying drawings. In the reference drawings, the same members are indicated by the same reference characters. To enhance understanding, the scales of these drawings are optionally changed. The illustrated embodiment is merely an example and thus does not limit the present invention.

FIG. 1 is a block diagram schematically showing a production system including a facility management unit according to the embodiment.

Referring to FIG. 1, a production system 10 includes multiple manufacturing facilities 11, a transport facility 12, a storage facility 13, a facility management unit 14, and a production planning device 15.

The manufacturing facilities 11, the transport facility 12, and the storage facility 13 are disposed in a manufacturing factory 16 for manufacturing parts, whereas the facility management unit 14 and the production planning device 15 are disposed in a different building from a manufacturing factory 16. For example, the facility management unit 14 may be disposed in a different building on the site of the manufacturing factory 16 that contains the manufacturing facilities 11 and the storage facility 13. In this case, the manufacturing facilities 11, the transport facility 12, and the storage facility 13 are preferably connected to the facility management unit 14 so as to communicate with each other via, for example, an intranet network 17.

The production planning device 15 may be disposed in, for example, an office remote from the manufacturing factory 16. Specifically, the production planning device 15 is preferably a cloud computer. In this case, the facility management unit 14 and the production planning device 15 are preferably connected so as to communicate with each other via, for example, an Internet network 18. Moreover, the production planning device 15 in the office preferably produces a part production plan for each of the manufacturing facilities 11 and manages the manufacturing statuses of the manufacturing facilities 11.

The manufacturing facility 11 of the present embodiment is an assembly of flexibly combined machines for manufacturing parts. For example, the manufacturing facility 11 may be a manufacturing facility of a line production system or a cell production system, that is, a manufacturing line or a manufacturing cell. Thus, as shown in FIG. 1, the manufacturing facility 11 is composed of n machines 19-1 to 19-*n* (n is a natural number). The number of machines in the manufacturing facility 11 is not limited in the present invention. The manufacturing facility 11 may include at least one machine where supplies are used. The supplies will be discussed later.

The machines 19-1 to 19-*n* may be selected from the following machines: an NC machine tool, an industrial robot, a measuring instrument, a tester, a press machine, a printer, a die casting machine, an injection molding machine, a food machine, a packaging machine, a welding machine, a washing machine, a coating machine, an assembling device, a mounter, a woodworking machine, a sealing device, and a cutter. The manufacturing facility 11 of the present embodiment may be, for example, a manufacturing line or a manufacturing cell that includes an injection molding machine, an NC machine tool, and an industrial robot. Each of the machines 19-1 to 19-*n* includes a memory, e.g., a ROM (read-only memory) or a RAM (random access memory), a CPU (control processing unit), and a communication unit (not shown). The communication unit controls the exchange of information with a first communication device 20 in the facility management unit 14.

The storage facility 13 is a facility that stores supplies for the manufacturing facilities 11, for example, an automated storage. The supplies including workpieces (machined parts), tools, and oils in a container are used for manufacturing parts in the manufacturing facilities 11. The transport facility 12 can transport supplies between the storage facility 13 and the manufacturing facilities 11. The transport facility 12 is, for example, a transport robot, an automated guided vehicle (AGV), or a pilotless aircraft.

The facility management unit 14 includes a computer having a CPU, ROM, RAM, and a communication control unit. The facility management unit 14 transmits individual operation commands to the machines of the manufacturing facilities 11 according to a production planning instruction from the production planning device 15. The machines of the manufacturing facilities 11 operate according to the operation commands. For example, the number of parts to be manufactured by each of the manufacturing facilities 11 per day is indicated from the production planning device 15 to the facility management unit 14. In this case, the facility management unit 14 calculates a cycle time for each of the manufacturing facilities 11 based on the indicated number of parts to be manufactured, and transmits a machine operation start command or operation stop command as an operation command to the machines of the manufacturing facilities 11 based on the cycle time.

Moreover, the facility management unit 14 collectively manages the consumption statuses of supplies for the manufacturing facilities 11 such that the manufacturing facility 11 to be replenished is preferentially replenished with supplies.

Specifically, the manufacturing facility 11 includes a storage part that stores supplies such as workpieces, tools, and oils in a container. The storage part may be, for example, a workpiece feeding device, an automatic tool changer, or an oil feeder. The machines of the manufacturing facilities 11 are automatically replenished with the supplies sequentially from the storage part according to the consumption statuses of the supplies for the manufacturing facilities 11. Furthermore, the manufacturing facility 11 has a functional part that monitors and stores the consumption statuses of supplies. The functional part may include, for example, a sensor and a memory. The facility management unit 14 acquires the consumption statuses of supplies from the sensor and memory in real time.

The facility management unit 14 of the present embodiment will be specifically described below.

As shown in FIG. 1, the facility management unit 14 of the present embodiment includes the first communication device 20, a second communication device 21, a facility information collection part 22, a supply replenishment determination part 23, an inventory information confirmation part 24, a transport command part 25, and a storage part 26. Regarding the first communication device 20, the second communication device 21, the facility information collection part 22, the supply replenishment determination part 23, the inventory information confirmation part 24, the transport command part 25, the storage part 26, etc., the following functions and operations can be implemented by programs executed by the CPU, the programs being stored in the ROM of a computer acting as the facility management unit 14.

The first communication device 20 can transmit the individual operation commands to the manufacturing facilities 11 via, for example, the intranet network 17 according to the production planning instruction from the production planning device 15. Furthermore, the first communication device 20 can receive operation information on the manufacturing facilities 11 for the respective operation commands via the intranet network 17.

The operation information on the manufacturing facilities 11 includes real-time operating statuses of the manufacturing facilities 11, for example, a machine operating time, a machine stop time, a cycle time, and a production volume. The operation information includes the progress of machining in response to the operation command or the progress of a machining program.

Moreover, the first communication device 20 can transmit an inventory information output command to the storage facility 13 via the intranet network 17 and transmit a transport status output command to the transport facility 12. The first communication device 20 can receive supply information on the consumption statuses of supplies from the manufacturing facilities 11, receive inventory information on supplies from the storage facility 13, and receive a transport status from the transport facility 12 via the intranet network 17.

The supply information includes the number of supplies stored in each of the manufacturing facilities 11 (hereinafter called the number of supplies in stock) and the consumption rate of supplies. This information relates to, for example, the types, weights, and sizes of supplies. The consumption rate of supplies indicates the number of supplies consumed when a predetermined number of parts are manufactured in the manufacturing facilities 11. For example, a certain tool is unusable when 200 parts have been manufactured. Thus, such a tool has a consumption rate of 1/200. In other words, one tool is consumed for manufacturing 200 parts.

The inventory information on supplies relates to the types and inventory amounts of supplies stored in the storage facility 13.

The transport status is information on the current position of the transport facility 12, the presence or absence of supplies on the transport facility 12, and the types of supplies.

The second communication device 21 can receive the production planning instruction from the production planning device 15 via, for example, the Internet network 18. The second communication device 21 can also transmit, to the production planning device 15, a determination result on whether replenishment is necessary or not from the supply replenishment determination part 23 and a supply inventory status confirmed by the inventory information confirmation part 24.

The facility information collection part 22 collects the supply information on the manufacturing facilities 11 and the operation information on the manufacturing facilities 11 in real time and stores the information in the storage part 26. The supply information and operation information are collected as described above.

The supply replenishment determination part 23 decides whether the manufacturing facilities 11 require replenishment with supplies based on the collected supply information on the manufacturing facilities 11; meanwhile, the supply replenishment determination part 23 determines the order of replenishment of all the manufacturing facilities 11 judged to require replenishment with supplies. Moreover, the supply replenishment determination part 23 stores the determined order of replenishment with supplies in the storage part 26.

As described above, the supply information on the manufacturing facilities 11 includes the number of supplies in stock in each of the manufacturing facilities 11 and the consumption rate of supplies in each of the manufacturing facilities 11. The information is used when the supply replenishment determination part 23 determines the order of replenishment with supplies.

For example, it is assumed that three manufacturing facilities a, b, and c for manufacturing a product s are constructed in a manufacturing factory and the order of replenishment of the manufacturing facilities with tools t is determined. The tool t is one of the tools used for manufacturing the product s in the manufacturing facilities.

It is assumed that the product s is manufactured by the manufacturing facilities a, b, and c under the following manufacturing conditions:

The manufacturing facility a receives a command for manufacturing 600 products s per day, the manufacturing facility b receives a command for manufacturing 200 products s per day, and the manufacturing facility c receives a command for manufacturing 800 products s per day.

In the manufacturing facilities a to c, the maximum number of the tools t in stock is set at 10.

Currently, it is assumed that three tools t are stored in the manufacturing facility a, two tools t are stored in the manufacturing facility b, and two tools t are stored in the manufacturing facility c.

Regarding the consumption rate of the tools t, it is assumed that one tool is consumed for manufacturing 200 products s. In other words, the consumption rate of the tools t is 1/200.

Under the manufacturing conditions, three tools t are consumed for manufacturing 600 products s per day in the manufacturing facility a (600/200=3). In the manufacturing facility b, one tool t is consumed for manufacturing 200 products s per day (200/200=1). In the manufacturing facility c, four tools t are consumed for manufacturing 800 products s per day (800/200=4).

Thus, in the manufacturing facility a, three tools t in stock are consumed in one day (3/3=1). In the manufacturing facility b, two tools t in stock are consumed in two days (2/1=2). In the manufacturing facility c, two tools t in stock are consumed in 0.5 days (2/4=0.5). In other words, the manufacturing facility a runs out of stock the next day, the manufacturing facility b runs out of stock two days later, and the manufacturing facility c runs out of stock on the same day.

For smooth manufacturing of parts, the manufacturing facilities a to c need to be replenished with the tools t before running out of stock. Thus, the manufacturing facility c, the manufacturing facility a, and the manufacturing facility b are sequentially replenished with the tools t in order of descending precedence of replenishment.

This satisfies the following expression (1):

$$Q=N/(M \times P) \quad (1)$$

where M is the number of products manufactured according to the manufacturing command per day, N is the current number of tools t in stock, P is the consumption rate of the tools t, and Q is a grace period until the manufacturing facilities run out of stock.

Thus, the supply replenishment determination part 23 determines the grace period Q for each of the manufacturing facilities 11, thereby determining priority for replenishment of supplies. Specifically, the supply replenishment determination part 23 preferably determines the order of replenishment with supplies based on the number of parts to be manufactured in each of the manufacturing facilities 11, the number of supplies stored in each of the manufacturing facilities 11, and the consumption rate of supplies in each of the manufacturing facilities 11.

Moreover, in the event of an unexpected situation during manufacturing of the products s in the manufacturing facilities a to c, for example, if a tool t is broken before the manufacturing facilities run out of tools, the number of tools t stored in the manufacturing facilities a to c may be changed. In this case, the order of replenishment with the tools t is determined as described above.

Specifically, it is assumed that the manufacturing facilities a, b, and c manufacture the products s under the above-mentioned manufacturing conditions. In other words, as described above, it is assumed that three tools t are stored in the manufacturing facility a, two tools t are stored in the manufacturing facility b, and two tools t are stored in the manufacturing facility c. The consumption rate of tools t is assumed to be 1/200.

In the manufacturing facility a, three tools t are consumed for manufacturing 600 products s per day (600/200=3). In the manufacturing facility b, one tool t is consumed for manufacturing 200 products s per day (200/200=1). In the manufacturing facility c, four tools t are consumed for manufacturing 800 products s per day (800/200=4).

In the manufacturing facility a, however, it is assumed that three tools are broken before being consumed. In this case, the number of tools t in stock changes from 3 to 0 only in the manufacturing facility a.

In the manufacturing facility a, the number of tools t in stock is 0 and thus the manufacturing facility a runs out of stock in 0 days (0/3=0). In the manufacturing facility b, the number of tools t in stock is two and thus the manufacturing facility b runs out of stock in two days (2/1=2). In the manufacturing facility c, the number of tools t in stock is two and thus the manufacturing facility c runs out of stock in 0.5 days (2/4=0.5). In other words, the manufacturing facility a has already run out of stock, the manufacturing facility b runs out of stock two days later, and the manufacturing facility c runs out of stock on the same day.

In this case, the manufacturing facility a, the manufacturing facility c, and the manufacturing facility b are sequentially replenished with the tools t in order of descending precedence of replenishment.

Expression (1) can be replaced with expression (2) below:

$$Q=(N-R)/(M \times P) \quad (2)$$

where R is the number of broken tools t (i.e., the number of lost tools).

Specifically, the supply replenishment determination part 23 preferably determines the order of replenishment with supplies based on the number of parts to be manufactured in each of the manufacturing facilities 11, the number of supplies stored in each of the manufacturing facilities 11, the number of lost supplies, and the consumption rate of supplies in each of the manufacturing facilities 11.

Moreover, the supply replenishment determination part 23 preferably acquires the operating statuses of the manufacturing facilities 11 in real time through the first communication device 20 and uses information on the operating statuses when the order of replenishment with supplies is determined as described above.

For example, it is assumed that the manufacturing facility a and the manufacturing facility b operate normally while the manufacturing facility c stops. In this case, the stopped manufacturing facility c in a normal operation runs out of stock on the same day. However, the manufacturing facility c requires a recovery period of two days and thus runs out of stock three days later. As described above, the operating manufacturing facility a runs out of stock next day and the operating manufacturing facility b runs out of stock two days later.

In this case, the manufacturing facility a, the manufacturing facility b, and the manufacturing facility c are sequentially replenished with the tools t in order of descending precedence of replenishment. In short, the order of replenishment of the manufacturing facilities 11 with supplies is determined in consideration of the operating statuses of the manufacturing facilities 11.

In the supply replenishment determination part 23 of the present embodiment, the necessity for replenishment with supplies is determined by monitoring whether each of the manufacturing facilities 11 has run out of stock. However, the timing for determining the necessity for replenishment of the manufacturing facilities 11 with supplies, that is, a threshold for determining the necessity for replenishment, is preferably set optionally in the supply replenishment determination part 23 from the outside of the facility management unit 14. Moreover, it is also preferable to optionally set a volume of replenishment of the manufacturing facilities 11 with supplies.

In the facility management unit 14 shown in FIG. 1, the inventory information confirmation part 24 acquires inventory information on supplies from the storage facility 13 and stores the information in the storage part 26. Based on the inventory information in the storage part 26, the inventory information confirmation part 24 confirms whether the storage facility 13 contains supplies for the manufacturing facilities 11 judged to require replenishment with supplies by the supply replenishment determination part 23. If the inventory information confirmation part 24 determines that the storage facility 13 does not contain supplies for the manufacturing facilities 11, the absence of supplies in the storage facility 13 is notified to the outside of the facility management unit 14, for example, the production planning device 15, by the second communication device 21.

If a confirmation result of the inventory information confirmation part 24 shows that the storage facility 13 contains supplies for the manufacturing facilities 11, the transport command part 25 indicates a transport path, along which supplies are sequentially transported from the storage facility 13 to the manufacturing facilities 11 in the determined order of replenishment with supplies, to the transport facility 12.

In the manufacturing factory 16, a plurality of paths allowing the passage of the transport facility 12 and the intersections of the paths are provided between the manufacturing facilities 11 and between the manufacturing facilities 11 and the storage facility 13. In the storage part 26 of the facility management unit 14, information including the positions of the paths, the positions of the intersections of the paths, and the installation positions of the manufacturing facilities 11 and the storage facility 13 is stored beforehand as transport path information. The transport command part 25 can acquire the current transport status of the transport facility 12 from the transport facility 12 through the first communication device 20. Based on the transport status and the supply replenishment order determined by the supply replenishment determination part 23, the transport command part 25 searches the transport path information for a transport path for sequentially transporting supplies to the manufacturing facilities 11 according to the order of replenishment with supplies.

Figure 2:
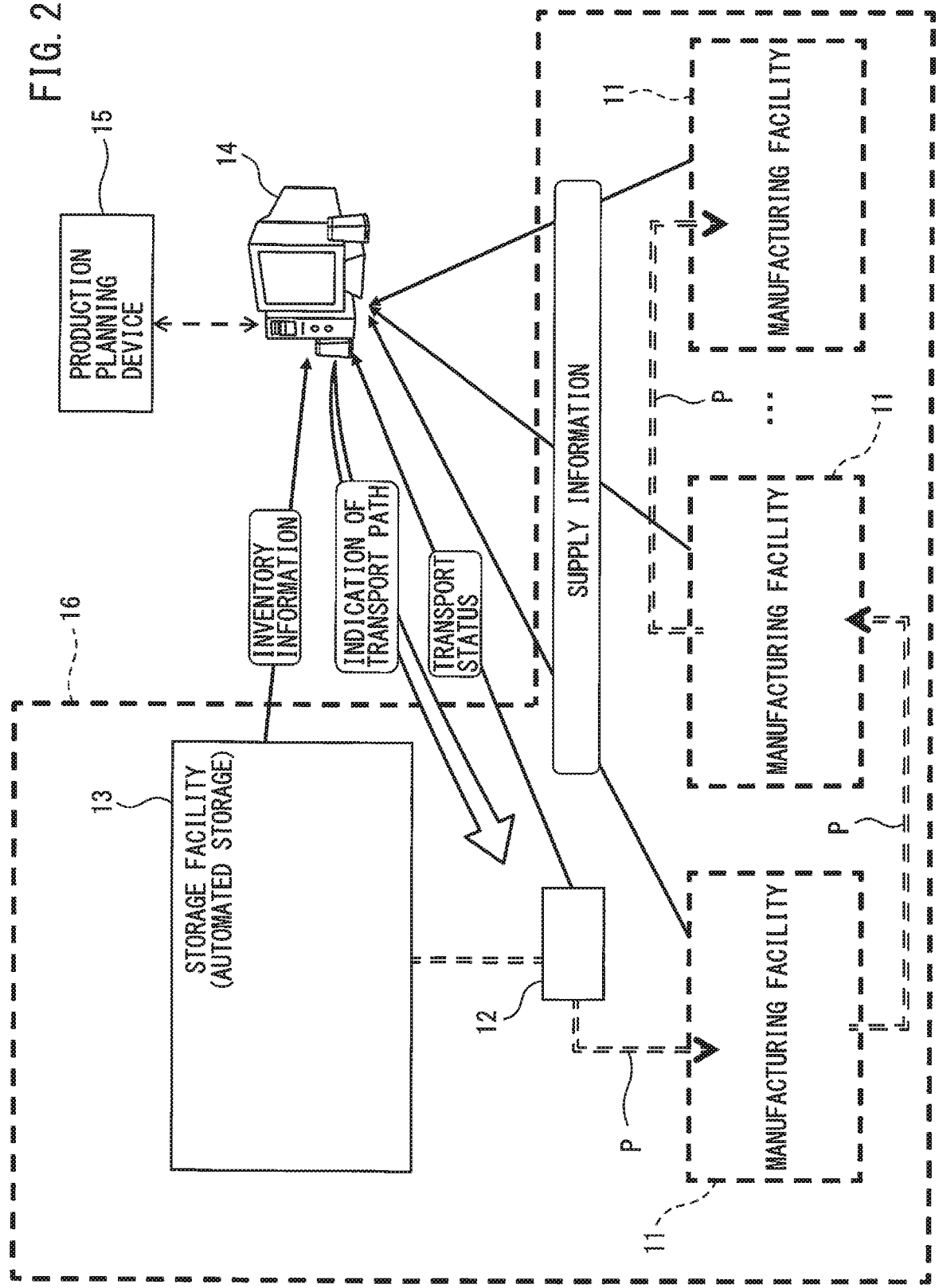
FIG. 2 schematically shows transport paths indicated by the facility management unit of FIG. 1 to transport facilities.

FIG. 2 schematically shows a transport path P indicated by the facility management unit 14 to the transport facility 12. As shown in FIG. 2, the facility management unit 14 acquires, for example, supply information on the manufacturing facilities 11, the transport status of the transport facility 12, and inventory information on the storage facility 13 in real time. The facility management unit 14 determines the order of replenishment of the manufacturing facilities 11 with supplies based on the supply information, plans the transport path P compliant with the order of replenishment based on the order of replenishment, the transport path information, and the current transport status, and indicates the transport path P to the transport facility 12. Moreover, the facility management unit 14 confirms the presence or absence of a stock of supplies based on the inventory information on the storage facility 13 before indicating the transport path P. It should be understood that the transport path P in FIG. 2 is merely exemplary and is changed according to the replenishment order determined by the supply replenishment determination part 23.

Figure 3:
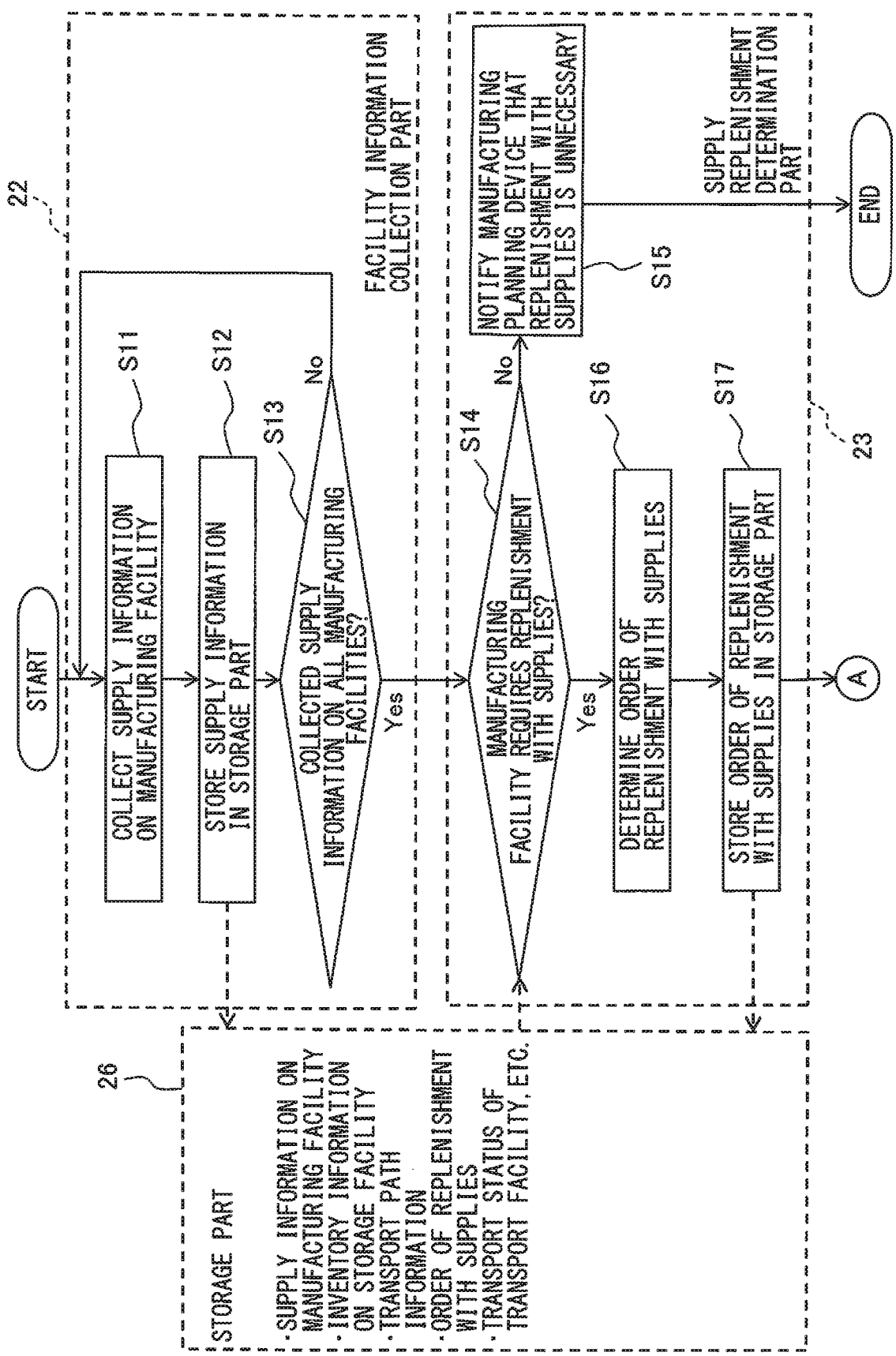
FIG. 3 is a flowchart showing a part of the procedure of the facility management unit shown in FIG. 1.

The procedure of the facility management unit 14 according to the present embodiment will be specifically described below. FIG. 3 is a flowchart showing a part of the procedure of the facility management unit 14 shown in FIG. 1. FIG. 4 is a flowchart showing the other part of the procedure. Flows in FIGS. 3 and 4 are connected via connectors denoted by the same character A. Boxes of broken lines in FIGS. 3 and 4 indicate flows performed by the facility information collection part 22, the supply replenishment determination part 23, the inventory information confirmation part 24, the transport command part 25, and the storage part 26 that are shown in FIG. 1.

First, in step S11 of FIG. 3, the facility information collection part 22 of the facility management unit 14 collects supply information on the manufacturing facilities 11 in real time. Subsequently, in step S12 of FIG. 3, the facility information collection part 22 stores the supply information on the manufacturing facilities 11 in the storage part 26. After that, in step S13 of FIG. 3, it is determined whether the facility information collection part 22 has collected the supply information on all the manufacturing facilities 11 in the manufacturing factory 16. As a result of the determination, if the facility information collection part 22 has not collected the supply information on all the manufacturing facilities 11 yet, steps S11 and S12 are repeated. If the facility information collection part 22 has collected the supply information on all the manufacturing facilities 11, the process advances to step S14.

In step S14 of FIG. 3, the supply replenishment determination part 23 determines the presence or absence of the manufacturing facilities 11 that require replenishment with supplies based on the supply information on the manufacturing facilities 11, the supply information being stored in the storage part 26. As a result of the determination, if any of the manufacturing facilities 11 do not require replenishment with supplies, in step S15 of FIG. 3, the supply replenishment determination part 23 notifies the production planning device 15 of the absence of the manufacturing facilities 11 that require replenishment with supplies. After that, the facility management unit 14 completes the process. In the presence of the manufacturing facilities 11 that require replenishment with supplies, the process advances to step S16.

In step S16 of FIG. 3, the supply replenishment determination part 23 determines the order of replenishment with supplies (priority order of replenishment) for all the manufacturing facilities 11 that require replenishment with supplies. Subsequently, in step S17 of FIG. 3, the supply replenishment determination part 23 stores the order of replenishment with supplies in the storage part 26. The method of determining the order of replenishment with supplies was described above.

Subsequently, in step S18 of FIG. 4, the inventory information confirmation part 24 acquires inventory information on the storage facility 13 from the storage facility 13 and then stores the information in the storage part 26. After that, in step S19 of FIG. 4, the inventory information confirmation part 24 confirms, based on the inventory information, whether the storage facility 13 contains supplies for the manufacturing facilities 11 that require replenishment with supplies. As a result of the confirmation, if the storage facility 13 does not contain supplies for the manufacturing facilities 11 that require replenishment with supplies, in step S20 of FIG. 4, the inventory information confirmation part 24 notifies the production planning device 15 of the absence of supplies for the manufacturing facilities 11 in the storage facility 13. Thus, a person in an office provided with the production planning device 15 can quickly take action to replenish the storage facility 13 with supplies. After step S20, the facility management unit 14 completes the process. If the storage facility 13 contains supplies for the manufacturing facilities 11 that require replenishment with supplies, the process advances to step S21.

In step S21 of FIG. 4, the transport command part 25 searches for a transport path of the transport facility 12 according to the order of replenishment with supplies, based on the transport path information stored in the storage part 26, the order of replenishment with supplies, the transport status of the transport facility 12, etc.

Specifically, the transport path information is stored beforehand in the storage part 26. In other words, information on the positions of the paths allowing the passage of the transport facility 12 and the positions of the intersections of the paths in the manufacturing factory 16 is stored as the transport path information. In the storage part 26, the order of replenishment with supplies for the manufacturing facilities 11 is also stored, the order being determined by the supply replenishment determination part 23. The transport command part 25 searches the transport path information for a transport path along which the transport facility 12 sequentially moves supplies from the storage facility 13 to the manufacturing facilities 11 in the supply replenishment order stored in the storage part 26.

Moreover, the transport command part 25 acquires a transport status from the transport facility 12 in real time and stores the status in the storage part 26. The transport status includes information on the current position of the transport facility 12. This allows the transport command part 25 to locate the transport facility 12 when the transport facility 12 is not positioned in the storage facility 13 but on a path between the storage facility 13 and any one of the manufacturing facilities 11. Since the transport status includes information such as the presence or absence of supplies on the transport facility 12 and the types of supplies, the transport command part 25 can also determine whether the transport facility 12 is transporting supplies for the manufacturing facilities 11 that require replenishment with supplies. If it is determined that the transport facility 12 has supplies for replenishment of the manufacturing facilities 11, the transport command part 25 searches the transport path information for a transport path along which the transport facility 12 sequentially moves from a current position to the manufacturing facilities 11 according to the transport order of supplies. If it is determined that the transport facility 12 does not have supplies for replenishment of the manufacturing facilities 11, the transport command part 25 searches the transport path information for a transport path along which the transport facility 12 moves from the current position to the manufacturing facilities 11 through the storage facility 13 according to the transport order of supplies.

Subsequently, in step S22 of FIG. 4, the transport command part 25 transmits a transport command to the transport facility 12 to indicate that supplies are to be transported along the determined transport path. In the manufacturing facilities 11 where supplies have been transported, the replenishment with supplies increases the number of supplies in stock, thereby changing the supply information. Thus, in step S23 of FIG. 4, the transport command part 25 notifies the production planning device 15 of the changed supply information. Moreover, the transport command part 25 stores the changed supply information in the storage part 26. The facility management unit 14 then completes the process.

As described above, the facility management unit 14 of the present embodiment collects the consumption statuses of supplies such as workpieces, tools, and oils, which are used in the manufacturing facilities 11, in real time from the manufacturing facilities 11 constructed in the manufacturing factory 16. This identifies which of the manufacturing facilities 11 require quick replenishment with supplies in the manufacturing factory. Moreover, an operator does not need to determine the necessity for replenishing the manufacturing facilities with supplies.

Furthermore, the facility management unit 14 collectively manages the consumption statuses of supplies for the manufacturing facilities 11, thereby determining the priority order of replenishment of the manufacturing facilities 11 that require replenishment with supplies. The manufacturing facilities 11 are automatically replenished with supplies according to the priority order and thus can be efficiently replenished with supplies.

In the above-mentioned embodiment, the manufacturing facility 11 is a manufacturing line or a manufacturing cell including the machines 19-1 to 19-n. The manufacturing facility 11 in the present invention may be a single machine or a single machine system. In other words, a manufacturing facility applicable to the present invention may include at least one machine replenished with supplies.

The present invention was described according to the typical embodiment. A person skilled in the art could understand that the embodiment can be changed and various other changes, omissions, and additions may be made without departing from the scope of the present invention.

EFFECT OF THE INVENTION

The present invention can collect the consumption statuses of supplies for the manufacturing facilities in the manufacturing factory and collectively manage the consumption statuses. This can identify which of the manufacturing facilities require quick replenishment with supplies in the manufacturing factory. Moreover, the facility management unit of the present invention can determine the priority order of replenishment of the manufacturing facilities that require replenishment with supplies and automatically replenish the manufacturing facilities with supplies according to the priority order. This can efficiently replenish the manufacturing facilities with supplies. Moreover, an operator does not need to determine the necessity for replenishing the manufacturing facilities with supplies.

The invention claimed is:

1. A facility management unit for managing manufacturing of parts in a plurality of manufacturing facilities, the facility management unit comprising:
   at least one communication device configured to communicate with the manufacturing facilities configured to manufacture the parts,
   a storage facility configured to store supplies including tools for manufacturing the parts in the manufacturing facilities, and
   a transport facility configured to transport the supplies between the storage facility and the manufacturing facilities;
   a memory configured to store a transport status, obtained in real time, including information on
   a current position of the transport facility, and
   presence or absence of at least one of the tools on the transport facility: and a processor configured to
   collect supply information on consumption statuses of the tools for the manufacturing facilities in real time,
   determine, based on the supply information collected on the manufacturing facilities, whether the manufacturing facilities require tool replenishment with the tools stored at the storage facility,
   determine an order of tool replenishment for all the manufacturing facilities that require tool replenishment,
   acquire inventory information on the tools from the storage facility,
   confirm, based on the inventory information, whether the storage facility contains the tools for the manufacturing facilities judged to require tool replenishment and
   indicate to the transport facility, a transport path along which the tools are sequentially transported from the storage facility to the manufacturing facilities in the determined order of tool replenishment in response to a determination that the storage facility contains the tools for the manufacturing facilities,
   wherein the processor is configured to
   determine, based on the transport status, whether or not the transport facility is transporting the tools for the manufacturing facilities that require tool replenishment and
   (i) indicate, to the transport facility, the transport path along which the transport facility sequentially moves from the current position to each manufacturing facility according to the determined order of tool replenishment, in a response to a determination that the transport facility has tools for replenishment of the manufacturing facilities, and
   (ii) indicate, to the transport facility, the transport path along which the transport facility moves from the current position to the each manufacturing facility through the storage facility, in a response to a determination that the transport facility does not have tools for replenishment of the manufacturing facilities,
   wherein the supply information includes information on
   a number of tools stored in each of the manufacturing facilities,
   a number of lost tools at each of the manufacturing facilities, and
   a consumption rate of the tools in each of the manufacturing facilities, and
   wherein the processor is configured to determine
   the order of tool
   replenishment based on
   the number of parts to be manufactured in each of the manufacturing facilities,
   the number of tools stored in each of the manufacturing facilities,
   the number of lost tools at each of the manufacturing facilities,
   and the consumption rate of the tools in each of the manufacturing facilities.

2. The facility management unit according to claim 1, wherein the processor is configured to
   acquire information on operating statuses of the manufacturing facilities,
   and
   determine the order of tool replenishment in consideration of the information on the operating statuses of the manufacturing facilities.

3. The facility management unit according to claim 1, wherein
   in response to a determination
   that the storage facility does not contain the tools for the manufacturing facilities, the processor is configured to cause the at least one communication device to notify the absence of the tools in the storage facility to outside of the facility management unit.

4. The facility management unit according to claim 1, wherein the processor of the facility management unit is configured to control operation of the manufacturing facilities according to a production planning instruction from a production planning device connected so as to communicate with the facility management unit via the at least one communication device.

5. The facility management unit according to claim 1, wherein
the processor is configured to
transmit a transport command to the transport facility to indicate that tools are to be transported along the determined transport path, and
notify a production planning device, connected so as to communicate with the facility management unit via the at least one communication device, of the supply information that has been changed by the tool replenishment at the manufacturing facilities.

6. A facility management unit for managing manufacturing of parts in a plurality of manufacturing facilities, the facility management unit comprising:
at least one communication device configured to communicate with
the manufacturing facilities configured to manufacture the parts,
a storage facility configured to store supplies for manufacturing the parts in the manufacturing facilities, and
a transport facility configured to transport the supplies between the storage facility and the manufacturing facilities;
a memory configured to store a transport status, obtained in real time, including information on
a current position of the transport facility, and
presence or absence of at least one of the supplies on the transport facility; and
a processor configured to
collect supply information on consumption statuses of the supplies for the manufacturing facilities in real time,
determine, based on the supply information collected on the manufacturing facilities, whether the manufacturing facilities require supply replenishment with the supplies stored at the storage facility,
determine an order of supply replenishment for all the manufacturing facilities that require supply replenishment,
acquire inventory information on the supplies from the storage facility,
confirm, based on the inventory information, whether the storage facility contains the supplies for the manufacturing facilities judged to require supply replenishment, and
indicate to the transport facility, a transport path along which the supplies are sequentially transported from the storage facility to the manufacturing facilities in the determined order of supply replenishment in response to a determination that the storage facility contains the supplies for the manufacturing facilities,
wherein the processor is configured to
determine, based on the transport status, whether or not the transport facility is transporting the supplies for the manufacturing facilities that require supply replenishment, and
(i) indicate, to the transport facility, the transport path along which the transport facility sequentially moves from the current position to each manufacturing facility according to the determined order of supply replenishment, in a response to a determination that the transport facility has the supplies for replenishment of the manufacturing facilities and
(ii) indicate, to the transport facility, the transport path along which the transport facility moves from the current position to the each manufacturing facility through the storage facility, in a response to a determination that the transport facility does not have the supplies for replenishment of the manufacturing facilities.

7. The facility management unit according to claim 6, wherein
the processor is configured to
transmit a transport command to the transport facility to indicate that supplies are to be transported along the determined transport path, and
notify a production planning device, connected so as to communicate with the facility management unit via the at least one communication device, of the supply information that has been changed by the supply replenishment at the manufacturing facilities.

* * * * *